Figure 1:
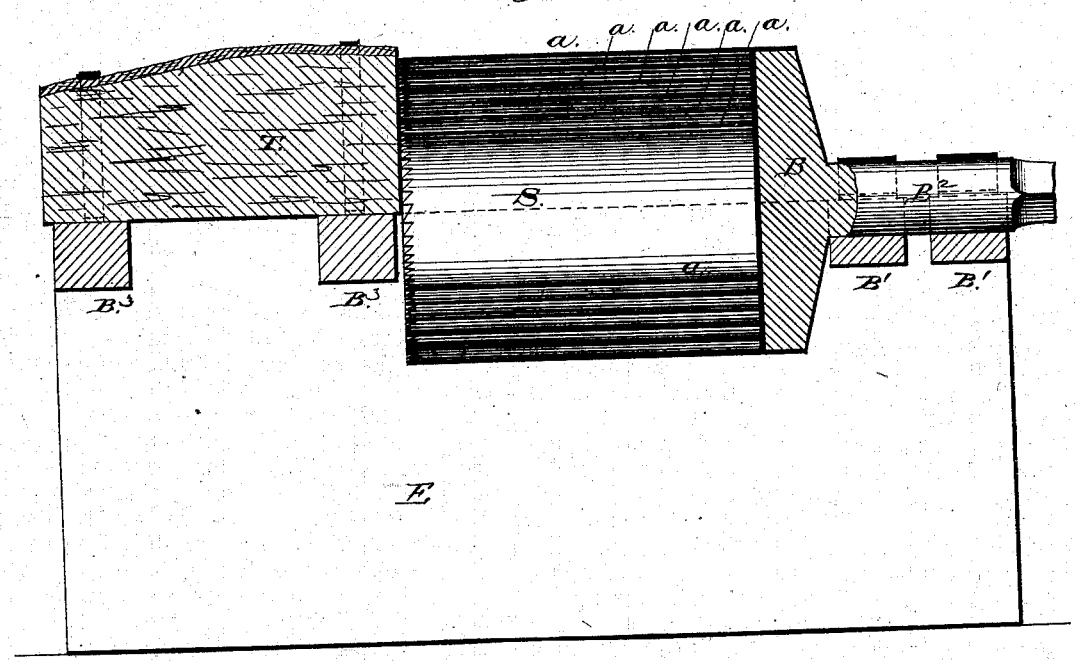
Figure 2:
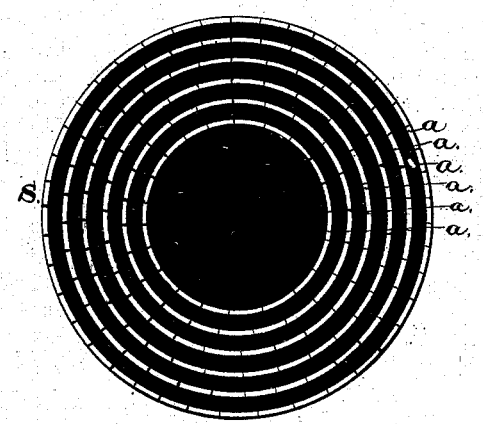

J. A. BALCH.
TUBULAR GANG-SAWS.

No. 186,293. Patented Jan. 16, 1877.

Attest:
Kirk Sheldon
R. S. Potter

Inventor:
James Anderson Balch

UNITED STATES PATENT OFFICE.

JAMES A. BALCH, OF EAST PORTLAND, OREGON.

IMPROVEMENT IN TUBULAR GANG-SAWS.

Specification forming part of Letters Patent No. 186,293, dated January 16, 1877; application filed March 6, 1876.

*To all whom it may concern:*

Be it known that I, JAS. A. BALCH, of East Portland, Oregon, have invented an Improvement in Gang-Saws, of which the following is a specification:

The invention has relation to a novel machine for sawing logs into boards of concavo-convex form, in cross-section to serve as material for the construction of cylindrical vessels; and it consists in the novel construction and arrangement of parts in a sawing-machine, the essential feature of which is a gang of concentric cylindrical saws attached to a single head, arranged with their axes in a horizontal line, and otherwise so disposed that a log of timber may, by a single operation, be cut up into a series or nest of concavo-convex boards of any desirable length within the limits of the machine.

Referring to the accompanying drawings illustrating my invention, $a\ a$, &c., designate a gang of cylindrical or tubular saws secured to a common head, B, and to a shaft, $B^2$, which has its bearings at $B^1\ B^1$, and with the saws is arranged in a horizontal position. A designates the frame of the machine, and $B^3\ B^3$ the portion of the latter corresponding to the log-carriage, which need not be particularly described or shown. T represents the log, and S the saw complete.

I am aware that a machine having tubular gang-saws is not, broadly, new; but I am not aware that heretofore any machine has been produced for the specific purpose as mine, namely, the cutting of timber into curved boards of any length or diameter.

The machines already in use for cutting barrel-staves and fellies will cut each but one size of stave or felly, thus occasioning much waste, as well as being altogether unfit for the economical cutting of logs for general use.

The employment of a number of concentric saws, or even more than two, is not a mere duplication, since a result is obtained which could not be obtained by two—that is, the utilization of the whole log.

Having described my invention, I claim as new and desire to secure by Letters Patent—

In a machine for sawing boards of various lengths and diameters, but concavo-convex in cross-section and straight lengthwise from logs of timbers, the saw S, consisting of a multiplicity of cylindrical saws, $a\ a$, &c., attached to a common head and rotating upon a horizontal axis, substantially as shown and described.

In testimony that I claim the foregoing I have hereunto subscribed my name in the presence of two witnesses.

JAMES ANDERSON BALCH.

Witnesses:
KIRK SHELDON,
R. S. POTTER.